(12) United States Patent
Snead

(10) Patent No.: US 7,844,833 B2
(45) Date of Patent: Nov. 30, 2010

(54) METHOD AND SYSTEM FOR USER PROTECTED MEDIA POOL

(75) Inventor: Robert R. Snead, King County, WA (US)

(73) Assignee: Microsoft Corporation, Redmond, WA (US)

( * ) Notice: Subject to any disclaimer, the term of this patent is extended or adjusted under 35 U.S.C. 154(b) by 2699 days.

(21) Appl. No.: 10/178,123

(22) Filed: Jun. 24, 2002

(65) Prior Publication Data

US 2003/0236988 A1 Dec. 25, 2003

(51) Int. Cl.
  *G06F 21/00* (2006.01)
(52) U.S. Cl. ............... 713/193; 713/185; 713/189; 711/111; 711/153; 711/163; 709/245; 709/250
(58) Field of Classification Search ............... 713/185, 713/189, 193; 711/111, 153, 163; 709/245, 709/250
See application file for complete search history.

(56) References Cited

U.S. PATENT DOCUMENTS

| 6,105,092 A * | 8/2000 | Oeda et al. ............... 710/104 |
| 6,425,059 B1 * | 7/2002 | Basham et al. ............ 711/153 |
| 6,615,353 B1 * | 9/2003 | Hashiguchi ................ 713/185 |
| 6,754,718 B1 * | 6/2004 | Dobberpuhl et al. ........ 709/250 |
| 6,986,006 B2 * | 1/2006 | Willman et al. ............ 711/152 |
| 2003/0172146 A1 * | 9/2003 | Collins ..................... 709/223 |

* cited by examiner

*Primary Examiner*—Carl Colin
(74) *Attorney, Agent, or Firm*—Shook, Hardy & Bacon L.L.P.

(57) ABSTRACT

The present invention is directed to a system and method for dynamically, segregating storage resources, pooling such resources into groups, assigning and associating security attributes with those groups. The present invention is further directed to protecting storage media within a shared mass storage device in a network computing environment by utilizing the security attributes. The system of the present invention incorporates a client/server and networked storage device infrastructure that allows dynamic and automatic support of access to storage devices from a plurality of client/server systems on a network.

4 Claims, 4 Drawing Sheets

METHOD AND SYSTEM FOR USER PROTECTED MEDIA POOL

STATEMENT REGARDING FEDERALLY-SPONSORED RESEARCH OR DEVELOPMENT

None

CROSS-REFERENCE TO RELATED APPLICATIONS

None.

TECHNICAL FIELD

The present invention relates to computer software. More particularly, the invention relates to a system and method for pooling and protecting mass storage media in a network computing environment.

BACKGROUND OF THE INVENTION

Computing systems today include a plethora of hardware and software components from a wide variety of manufacturers. The need for efficient and consistent collaboration between these various components is essential to the success and usefulness of these computing systems. In particular, the storage of information is an essential part of any computing system or network infrastructure. Performance of storage systems in addition to capacity increases continue to be mainstream issues for computing environments. The performance of storage systems is continuously challenged by the need for increased storage capacities and network speeds. As more users need to access and store information on systems other than their local computer or network, remote and distributed storage systems become a more critical component of the computing environment. The ability to send block-level data or files over IP networks provides a solution to some of the these access and storage network requirements in the Local Area Network (LAN), Wide Area Network (WAN) and Internet environments. However, this raises issues relating to the management of storage on such systems including implementation of security across multiple mass storage devices and storage media, which need to be addressed.

The need to disseminate and access information and more critically, the role that information plays in today's society increase the need to not only centralize information for ease of access but to also ensure the integrity and security of such information. Shared mass storage devices such as backup devices, disk arrays and CD arrays form an integral part of both commercial and non-commercial networks and enable such centralized or shared capabilities. Of critical importance with respect to these shared devices is the issue of security.

Secure access to shared devices and the information contained thereon has traditionally been addressed by closely associating the shared device with a particular computing systems to which the device is attached i.e. Direct Attached Storage (DAS). In other cases, each mass storage device is associated with a unique identifier to enable visibility to one computing system at a time on a network and this is known as Network Attached Storage (NAS). NAS provides for connectivity, data security and load balancing. NAS also allows the sharing of storage devices and files by heterogeneous client systems and serves data directly over a network to these systems. Yet another approach to the shared storage dilemma was the Storage Attached Network (SAN). SAN is typically a proprietary configuration and scheme to integrate different types of storage systems into a single systems on the network. In other words, SAN is directed at interoperability among heterogeneous servers and storage products. However, SAN is typically only appropriate in applications where Fibre Channel (FC) and Fibre Channel Protocol for SCSI (FCP) security issues can be managed.

In conjunction with the various network storage configurations discussed earlier, i.e. DAS, NAS and SAN, there are one or more underlying protocols for communicating with the mass storage devices. Small Computer System Interface (SCSI), FC and Internet Small Computer System Interface (iSCSI) are the current protocols utilized for mass storage communications. Each of these protocols enable access to network storage devices however, this also means that there is a possibility of access by any number of network users. As such, both the storage device and any media within such devices, need to be further subjected to some protection or security limitations.

To address this issue, various implementations of security for network device access have been implemented by various operating system environments and application programs. However, these implementations have been limited to the application of security for only the mass storage device, to the exclusion of the media within such device. So for example, regardless of which user or application writes to a particular removable media such as a tape, anyone with the appropriate security access to the tape drive will have the ability to read, write and modify the content of that tape media. Such free access is undesirable an should thus be addressed.

Under normal circumstances a user or an application program may need to access more than one storage media or type of storage media. For example a user who is running a backup application may need to access multiple tapes. As such, a security scheme that attaches permissions to each tape would result in a significant attribute and permission designations that are both redundant and repetitive. In such instances when such designations would be identical for each member of a group, user level security can be applied to groups of users rather than individual users. A media access security scheme would also benefit from being able to group similar tapes or media and attach permissions to such media groupings.

In light of the foregoing, there exists a need to provide a system and method that will enable the designation and implementation of security that will transcend the underlying storage device communication protocol and provide a permission based security that is associated with the storage media rather than the storage device. Furthermore, there exists a need for a method of pooling storage media and associating user level security to such pools.

SUMMARY OF THE INVENTION

The present invention is directed to a method and system for use on a computer to designate and assign security to mass storage media that resided on a share mass storage network device.

In one aspect of the present invention, a system and method are provided for segregating storage media and storage device security attributes.

In another aspect of the present invention, a system and method are provided for grouping storage media.

In a further aspect of the present invention, a system and method are provided for enabling and validating access to storage devices and storage media.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawings figures, wherein.

DETAILED DESCRIPTION OF THE INVENTION

The present invention is directed to a system and method for dynamically, segregating storage resources, pooling such resources into groups, assigning and associating security descriptions with the groups and protecting storage media within a shared mass storage device in a network computing environment by utilizing the security descriptions. The system of the present invention incorporates a client/server and networked storage device infrastructure that allows dynamic and automatic support of access to storage devices from a plurality of client/server systems on a network.

According to the method of the present invention, storage media with a storage device are grouped and assigned security attributes that are separate and apart form the security attributes of the storage device. Access to storage media within such groups by network systems are then permitted at an application program level, based on the security privileges associated with an individual user, whose identity enables the application programs to execute within the operating environment.

Having briefly described an embodiment of the present invention, an exemplary operating environment for the present invention is described below.

Exemplary Operating Environment

Figure 1:
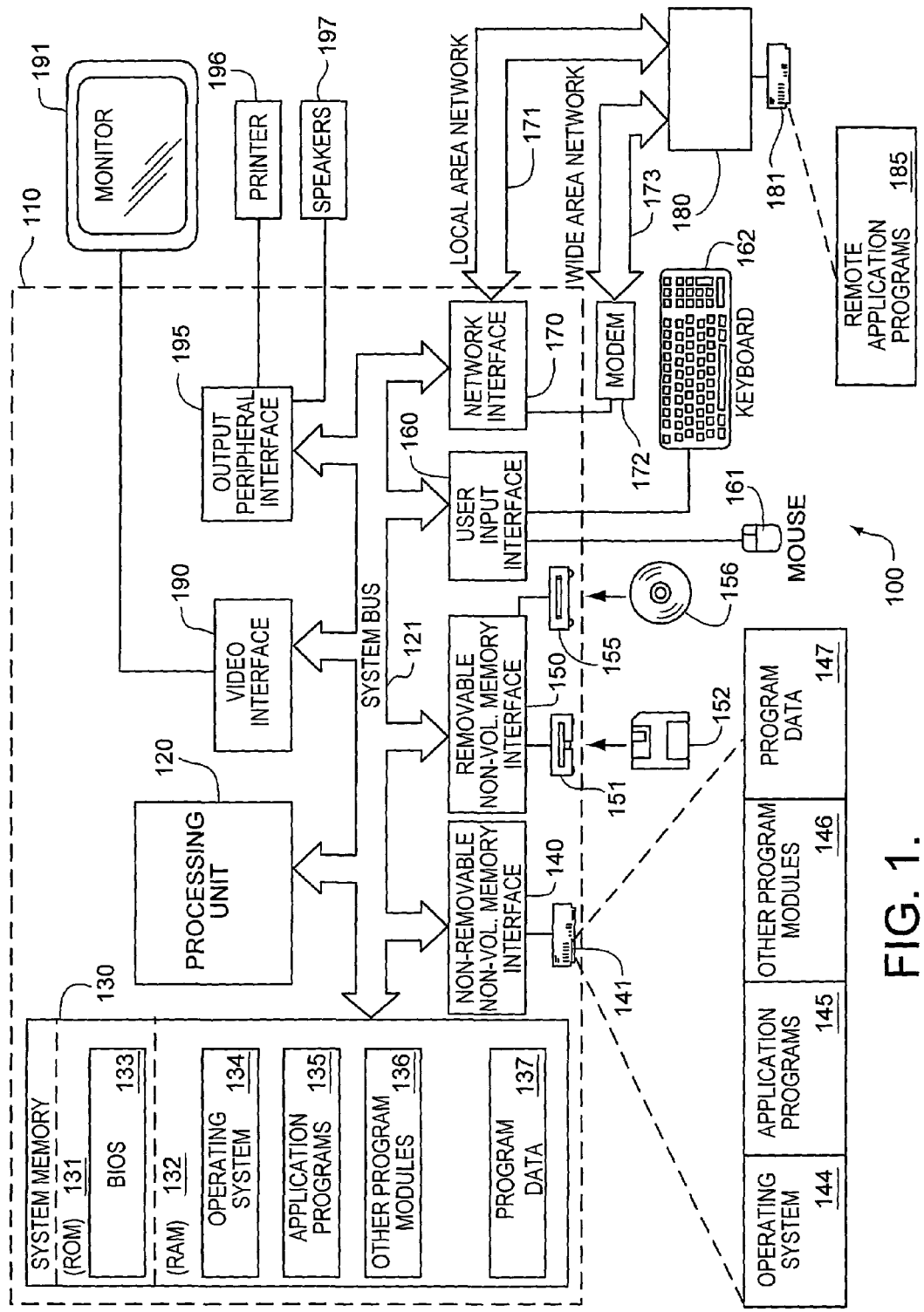
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

System and Method for User Protected Media Pools

The present invention is directed to a system and method for dynamically, segregating storage resources, pooling such resources into groups, assigning and then associating security descriptions with the groups. Storage media within a shared mass storage device in a network computing environment are then protected by utilizing the group security descriptions.

The present invention will be discussed with reference to an implementation for a tape library system, utilizing the ISCSI protocol and a permission based security system. The security system utilizes catalogs of objects and attributes associated with those objects, wherein the objects represent individual tapes. However, it is anticipated and within the scope of the present invention that the methods described herein are equally applicable to other removable storage systems, as well as to non-removable mass storage arrays. Such other systems may utilize one or more variations of network access protocols. Furthermore, those skilled in the art will readily recognize and appreciate that there are various techniques for assigning and associating security with an object and that such variations are within the scope of the present invention.

The present invention will be also discussed with reference to some particular application programs that can be found in MICROSOFT's WINDOWS Operating Environment. As would be understood by those skilled in the art, such references are provided for clarification in the understanding of the present invention and should not in anyway be considered as limiting the invention to this or any other operating environment, standard or application programs.

The present invention may be described in the general context of computer-executable instructions such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Mass storage devices such as disk arrays, Compact Disk Recordabale (CD-R) libraries, tape libraries, removable media devices and non-removable media devices such as disk arrays, can and are made accessible on a network to multiple users. There are several protocols that facilitate access to such devices and the media contained within those devices such as FC and iSCSI.

Figure 2:
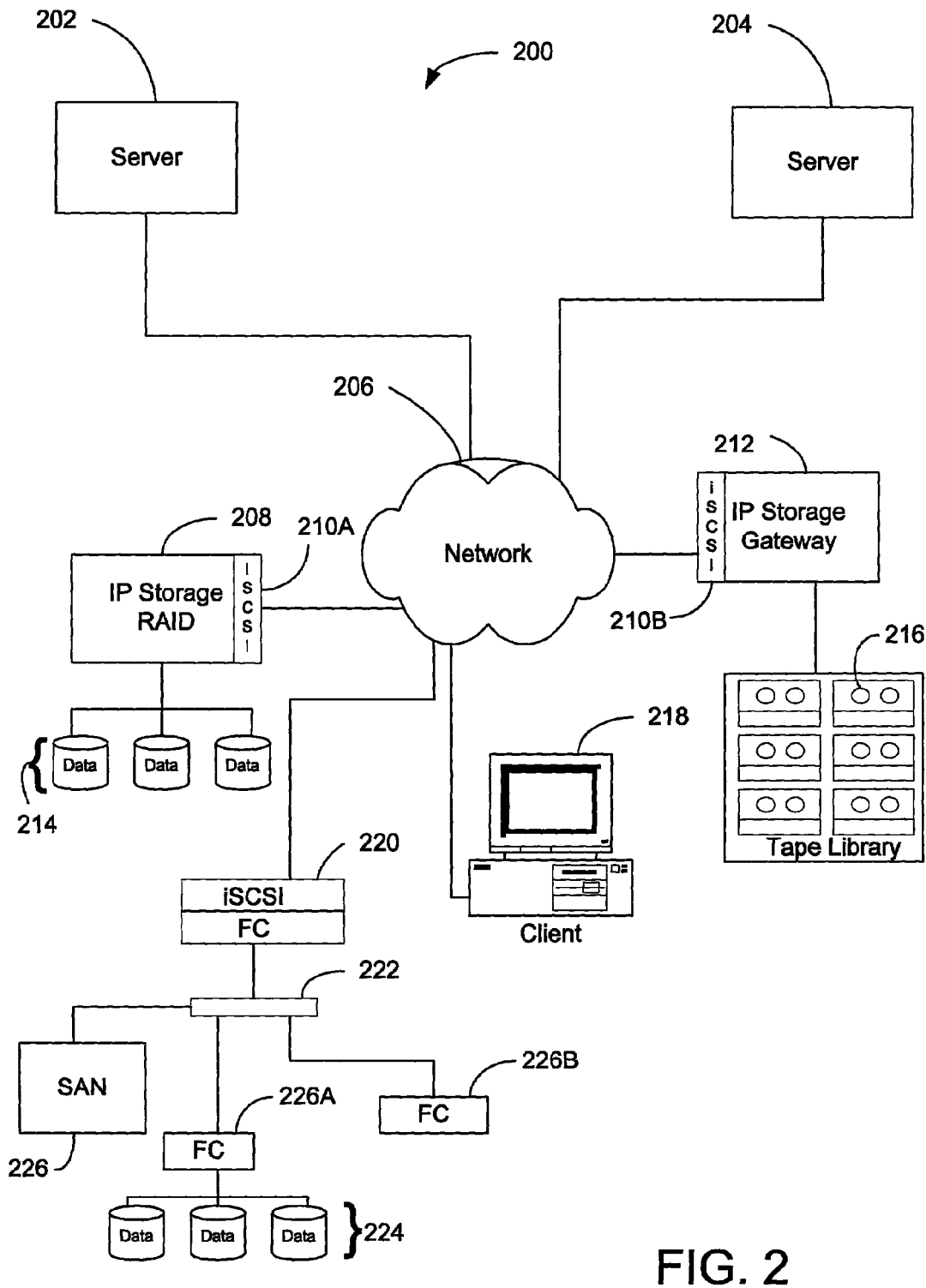
FIG. 2 is a network architectural diagram illustrating an environment that utilizes shared network storage devices and supports a variety of mass storage device communication protocols.
Figure 3:
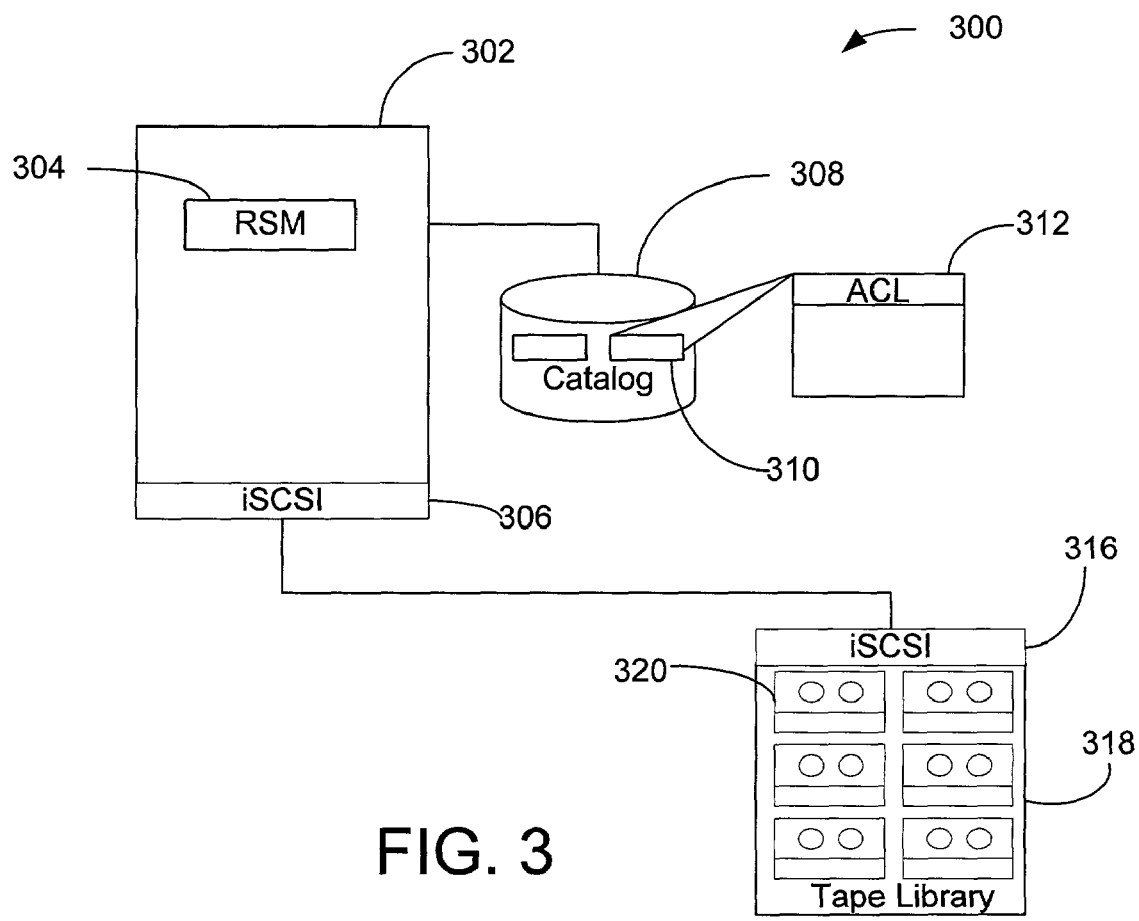
FIG. 3 is a schematic diagram, illustrating a traditional shared network media device with a dedicated library device manager.

By way of example and not limitation, an illustrative computing network with attached mass storage devices will be discussed with reference to FIG. 2 and generally referenced as network architecture 200. As shown, a typical network 206, such as a LAN, WAN or Internet, provides the infrastructure for inter-connecting several systems and devices. Such a network 206, could contain one or more of the following components—servers 202, 204, client system 218, network accessible mass storage devices 208, 216, 226, and 224, switches 228A, 228B, routers 222, gateways 212, 220 and other devices. Certain bus technologies such as FC and iSCSI enable multiple computing systems such as client 218 to communicate directly with one or more mass storage devices 208, 216, 226 and 224 and the media they contain. Server systems 202, 204 provide data repository using DAS, network access validation, and other network functions which will not be discussed in any great detail herein. Storage on a server can be provided on individual drives or more sophisticated disk arrays 214, which can reside with the server or in a separate network storage device. A disk array 214, can be connected to the network 206 through an IP storage Redundant Array of Independent Disks (RAID) device 208. The IP storage RAID device 208 connects to the network 206 via an iSCSI interface card 210A. Similarly a tape library 216 can also be connected via an IP storage gateway 212 and iSCSI interface card 210B to the network 206. Also, in a somewhat similar fashion FC type devices or SAN can also be connected to the network 206 utilizing an interface such as an iSCSI/IFC bridge gateway 220. The FC router 222 provides identification and mapping to individual FC devices 226A, 226B or the FC SAN 226. An individual FC device 226A can also be connected to one or more disks 228 or similar storage. As would be understood by those skilled in the art, several combinations of the above devices and similar components are possible to enable multiple access to remote storage devices on the network In an embodiment of the present invention, a system that utilizes a storage device library manager such as MICROSOFT's Removable Storage Manager (RSM), is used to implement the method of managing tape devices and maintaining a catalog of the tape media within the device. An illustration of a traditional shared network media device with a dedicated library device manager is shown in FIG. 3 and referenced as 300. In shared network environments, there is no limit to the number of devices that can hang off the network. However, in order to facilitate an understanding of the present invention this discussion will focus on a configuration wherein a mass storage SCSI device is controlled and accessed by a single computing system. As shown, a computing system 302 contains among other hardware and software components, a library manager—RSM 304, and an iSCSI interface 306. A mass storage device such as a tape library 318 is connected to a network via an iSCSI interface 316. It should be understood that an iSCSI interface can consist of a dedicated hardware adapter module with processing capability or be implemented in a software module that accepts/sends and parses/builds SCSI messages, formatted for transmission over an IP network. The mass storage tape library device 318 contains some tape media 320, which in this case are controlled by RSM 304.

Generally, a library manager such as RSM 304 controls access to a library device, the loading, identification and cataloging of the device media. As such, RSM 304 maintains a catalog 308. The catalog 308 contains definitions for an object 310. An object 310 is defined to represent each of the tape media 320. Each object 310 is associated with a series of attributes, which describe and specify details relating to each tape media 320. For example attributes can include things such as tape capacity, tape label identifier, free space and so on. In particular, the present invention provides that one of the attributes for the object 310 is an Access Control List (ACL) 312. An ACL is essentially an association of one or more user identities, with functions and permissions that are available to that user with regards to one or more objects.

In an embodiment of the present invention, the library manager RSM 304 controls who can access the tape media 320 as opposed to traditional systems where the library manager controls access to the tape library device 318. In other words, the present invention enables RSM 304 to control the ACL 312 for the tape media 320. It should be noted that an ACL also exists for the tape device 318. In fact, the tape device's ACL and the tape media's ACL are separate for removable media devices. In the case of non-removable media such as disk arrays, the ACL of the media and the device are one and the same. But even in such cases, the ACL of the media governs accessibility to the device. This is because allowing the ACL for a device to govern access to the media yields an undesirable condition, which allows anyone with access to a particular device to also have access to any media placed within such device, regardless of any security constraints on the information contained thereon. Thus, utilizing RSM 304 in the described manner overcomes this security breach.

However, a library manager such as RSM does not operate well with shared bus devices due to contentions for device control. Traditional approaches to resolve this contention problem have included sharing methodologies that incorporate the masking (hiding) of devices from a number of computing systems. The thought being that there can be no contention for an unseen device. Such masking techniques include Logical Unit Number (LUN) masking, wherein each mass storage device is assigned a static identification number. The user of the static identification number makes the device visible to particular computing systems, such as the system that will control the device. As such, even though a storage device is on the network, only the controlling computing system has access to the device. While this single computing system control of a shared device makes sense to prevent control contentions, it creates other non-desirable effects. For instance, the lack of visibility of a mass storage device to the entire network limits the ability to have network devices utilize the device in a meaningful manner. In fact, such a scheme begins to look more like a Direct Access Storage system.

In a further embodiment of the present invention, network visibility and sharing is addressed by providing application programs that are being executed on any networked computing system, with access to groupings of media on a shared network device. Each executing application program is associated with a grouping of media that are accessible to the user under whose security 'persona' the application program is being executed. In other words, individual application programs on computing systems are executed under a security identifier (SID) of individual users. Application programs can create and specify the rules for the grouping of pools of media. The ACL for a media or group of media also includes user SIDs. As such, in an embodiment of the present invention application programs are only given access to those media pools for which there is a match of SIDs between the program and the media pool. A more detailed implementation of this embodiment will be described with reference to FIG. 4.

Figure 4:
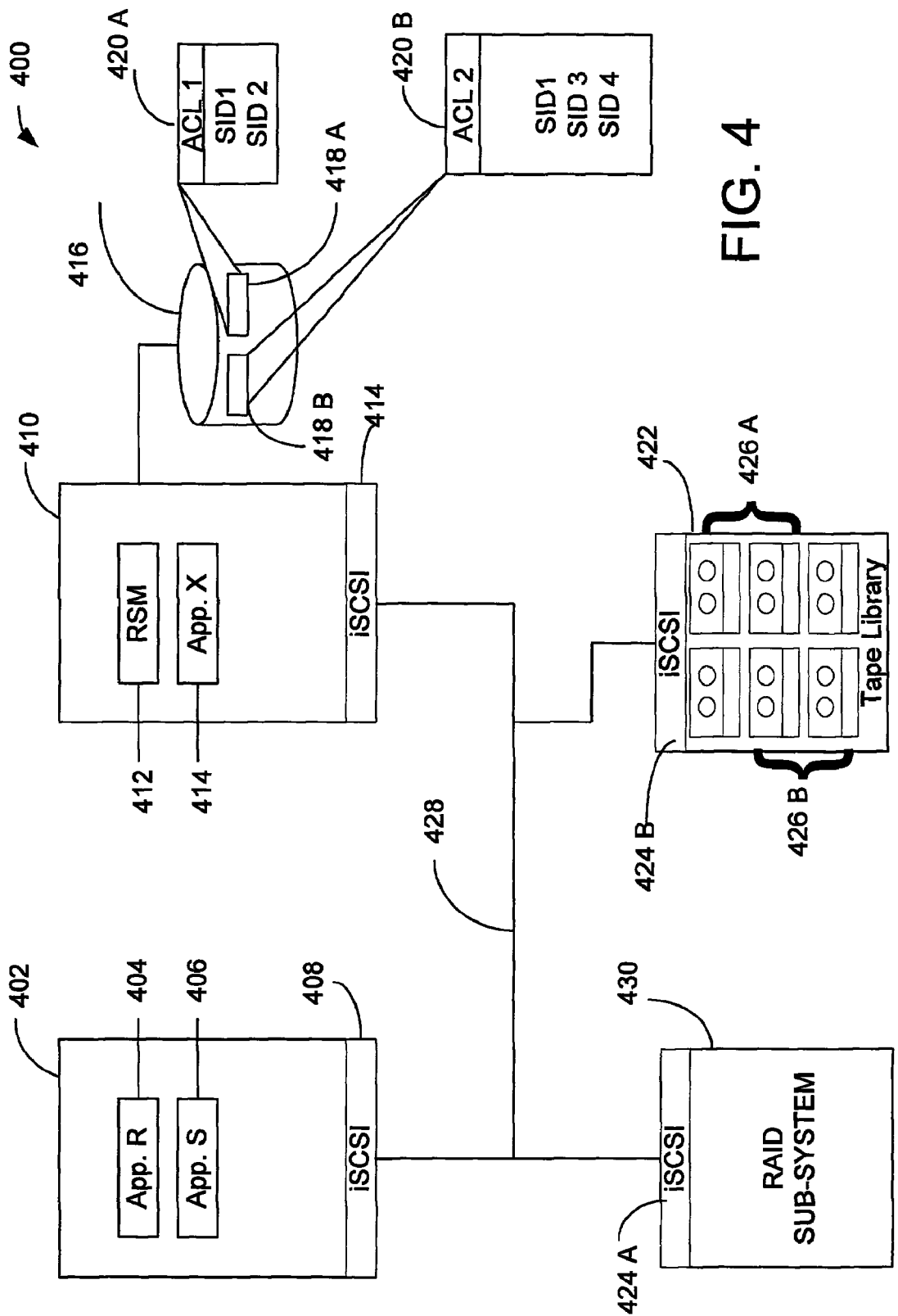
FIG. 4 is a schematic diagram, illustrating the concept of the present invention with a shared network media device that is controllable by a library device manager and accessible by multiple computing systems.

A schematic diagram, illustrating a shared network media device that is accessible by multiple application programs and computing systems is shown in FIG. 4 and generally referenced as 400. A first computing system 402, a second computing system 410 and mass storage devices 422, 430 are inter-connected via a network segment 428. Both computing systems 402 and 410 include iSCSI interfaces 408 and 414 respectively, to enable communications to the mass storage device 422A, 424B and any other such devices. Mass storage devices 422, 424 also have iSCSI interfaces 424A, 424B. For purposes of the description of the present invention, computing system 402 locally executes two application programs, namely App. R 404 and App.S 406. Computing system 410, is executing an application program App. X 414 as well a library management component RSM 412. For the most part, RSM 412, catalog 416, catalog objects 418A, 418B and the corresponding attribute ACLs 420A, 420B of catalog object 418A, 418B are similar to and operate in a manner consistent with the previous description respecting FIG. 3. Also consistent with the discussion of FIG. 3, is the fact that RSM 412, which is located in computing system 410 is associated with and controls mass storage device 422. However, the similarity ends there. In this further embodiment of the present invention, device 422 is also accessible to and can receive commands from computing system 402. This communication between system 402 and device 422 is much the same as with any mass storage device that is connected to the network via an iSCSI interface, such as RAID subsystem 430. In fact, in this embodiment of the present invention, every network connected mass storage device is accessible to all systems on the network. However, each device is controlled by only one RSM at a time. RSM may reside on any system attached to the network, and need not only control one mass storage device.

In operation, when an application program such as App. R 404 is being executed on a remote computing device such as computing system 402, the application is executing under some SID. In other words, any program executing on a computing system does so by virtue of the security rights of the logged in user or a default pseudo system user. The application is thus associated or identified with the attributes of that user. As previously discussed, a group of media such as tape groupings 426A, 426B are pooled and each group is associated with an ACL 420A, 420B. Each ACL 402A, 420B have as attributes, one or more SID's of user's who have access permissions to the group of media.

For example, ACL1 420A has as attributes SID1 and SID2. Further, ACL1 420A is the catalog object for tape grouping 426A, thus hypothetical USER1 or USER2 (who are identified by the corresponding SID i.e. SID1 and SID2) are permitted access to the tapes in the grouping 426A. It should also be noted that because ACL2 420b includes SID1 as an attribute, USER1 can also access tape grouping 426B, similar to USER3 and USER4, with respective attributes SID3 and SID4.

Since RSM 412 controls the storage device 422, App. R 404 of computing system 402 essentially requests form RSM 412 access to tape media in the device 422. Assuming that App. R 404 is executing under SID1, the master system RSM 412 makes the drive device 422 and tape library media groups 426A and 426B accessible to the application App. R 404. However, in the case of App. S 406, which is hypothetically executing under SID3, only library tape media group 426B would be made accessible. In other words, RSM 412 will cause tape media group 426B to be loaded when it makes the drive device 422 accessible to APP S 406.

In much the same manner as is applicable to App. R 404 and App. S 406, when App. X 414 needs access to a tape media in the tape library device 422, it will also request access from RSM 412. As with the other applications the tape media group that would be made available, would depend on the execution SID for App. X 414.

As would be understood by those skilled in the art, functions discussed as being performed on the client side or server side could be performed on any one or more computing devices, in a variety of combinations and configurations, and such variations are contemplated and within the scope of the present invention.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

I claim:

1. A method in a computing system for controlling a shared mass storage device and providing secure access to one or more media that can be operatively placed in said shared device, from a master computing device comprising:
    receiving on the master computing device, a request to access said one or more media within said shared mass storage device from an application program;
    utilizing a catalog to determine the permissions associated with a first secured identity for said application program;
    matching said application program secured identity with a second secured identity for said one or more media; and
    providing through the master computing device, access to the matched one or more media by said application program.

2. A computer system having a processor, a memory and an operating environment, the computer system operable to execute the method of claim 1.

3. A method in a networked computing environment for providing access, through a master computing device, to data on one or more storage media on a mass storage device by an application program comprising:
    grouping on the master computing device the one or more storage media for the mass storage device into media pools;
    associating said media pools with a first security identifier; and
    utilizing a second security identifier of the application program to provide access, through the master computing device, by the application program, to said media pools on the mass storage device, based on a matching of said first and second security identifiers.

4. A computer system having a processor, a memory and an operating environment, the computer system operable to execute the method of claim 3.

* * * * *